Dec. 3, 1957        A. H. SNELL        2,815,319
FAST NEUTRONIC REACTOR
Filed Oct. 11, 1945
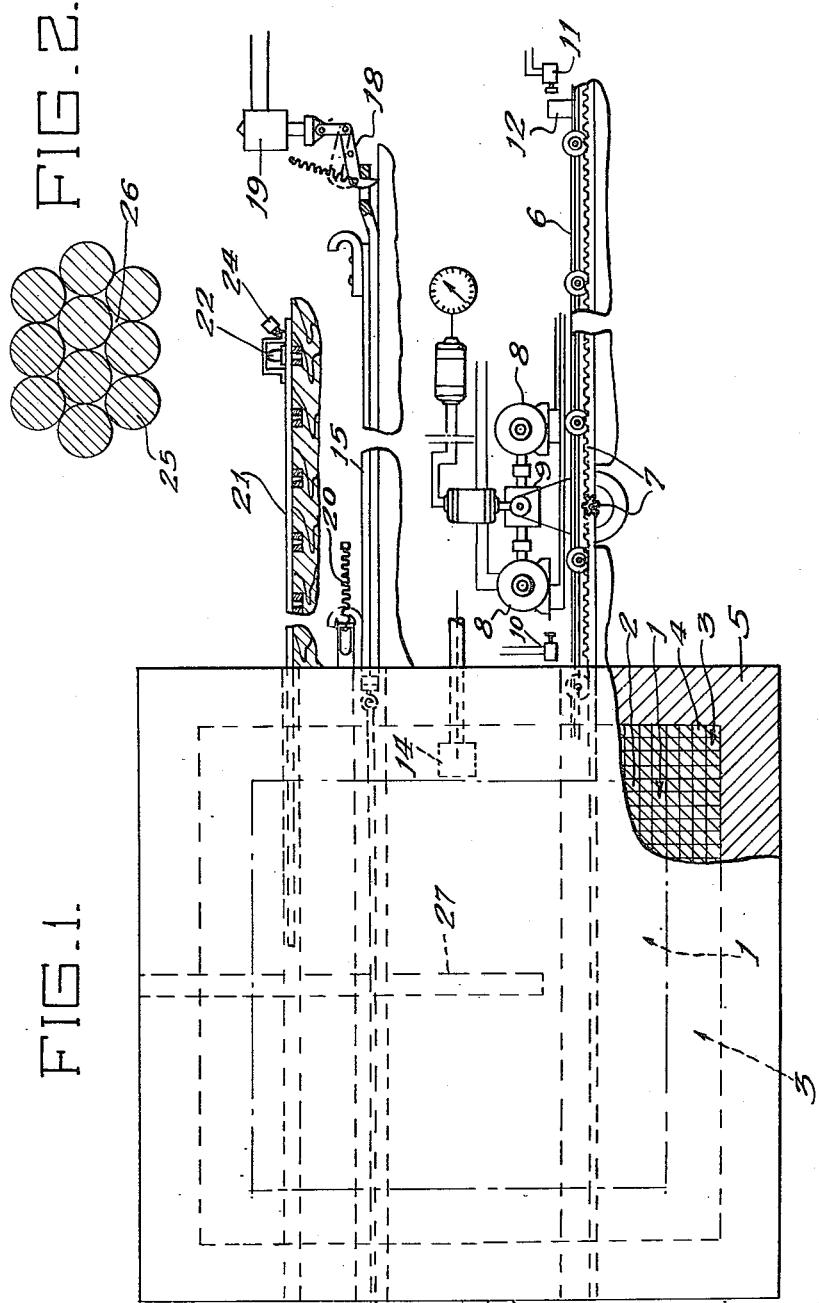
Inventor: Arthur H. Snell United States Patent Office 2,815,319
Patented Dec. 3, 1957

2,815,319

FAST NEUTRONIC REACTOR

Arthur H. Snell, Oak Ridge, Tenn., assignor to the United States of America as represented by the United States Atomic Energy Commission Application October 11, 1945, Serial No. 621,843

3 Claims. (Cl. 204—154.2)

The present invention relates to the general subject of nuclear fission and particularly to the establishment of controllable self-sustaining fast neutron chain fission reactions in reactive compositions of uranium metal.

Experiments by Hahn and Strassman, the results of which were published in Naturwissenschaften, 27, 11–15, January 1939, led to the conclusion that nuclear bombardment of natural uranium by slow neutrons causes explosion or fission of the nucleus which splits into particles of smaller charge and mass with energy being released in the process. Later it was found that neutrons were emitted during the process and that the fission was principally confined to the uranium isotope $U^{235}$ present as .71% of the natural uranium.

When it became known that the isotope $U^{235}$ in natural uranium could be split or fissioned by bombardment with thermal neutrons, i. e., neutrons at or near thermal equilibrium with the surrounding medium, many predictions were made as to the possibility of obtaining a a self-sustaining chain reacting system operating at high neutron densities. In such a system, the fission neutrons produced give rise to new fission neutrons in sufficiently large numbers to overcome the neutron losses in the system. Since the result of the fission of the uranium nucleus is the production of lighter elements with great kinetic energy, plus approximately 2 fast neutrons on the average for each fission along with beta and gamma radiation, a large amount of power could be made available if a self-sustaining system could be built.

In order to attain such a self-sustaining chain reaction in a system of practical size, the ratio of the number of neutrons produced in one generation by the fissions, to the original number of neutrons initiating the fissions, must be known to be greater than unity after all neutron losses are deducted, and this ratio is, of course, dependent upon the values of the number of neutrons produced per fission and the number lost in the chain without producing fission.

In a self-sustaining chain reaction of uranium with slow neutrons, as presently understood, $92^{238}$ is converted by neutron capture to the isotope $92^{239}$. The latter is converted by beta decay to $93^{239}$ and this $93^{239}$ in turn is converted by beta decay to $94^{239}$. Other isotopes of 93 and 94 may be formed in small quantities. By slow or thermal neutron capture, $92^{235}$ on the other hand, can undergo nuclear fission to release energy appearing as heat, gamma and beta radiation, together with the formation of fission fragments appearing as radioactive isotope of elements of lower mass numbers, and with the release of secondary neutrons.

While uranium has been said to comprise a fissionable isotope $U^{235}$ and a non-fissioning isotope $U^{238}$, this premise only holds for slow or thermal neutrons in that $U^{235}$ is fissionable by both fast and slow neutrons, whereas $U^{238}$ is fissionable by fast neutrons only. In the slow neutron chain reaction, there is a small contribution of neutrons to the chain by fast neutron fission of $U^{238}$.

As element 94 is a transuranic element, it can be separated from the unconverted uranium by chemical methods, and as it is fissionable by slow neutrons in a manner similar to the isotope $92^{235}$, it is valuable, for example, for enriching natural uranium for use in other chain reacting systems of smaller overall size. The fission fragments are also valuable as sources of radioactivity.

The ratio of the fast neutrons produced in one generation by the fissions to the original number of fast neutrons in a theoretical system of infinite size where there can be no external loss of neutrons is called the reproduction or multiplication factor or constant of the system, and is denoted by the symbol K. For any finite system, some neutrons will escape from the periphery of the system. Consequently, a system of finite size may be said to have a K constant, even though the value thereof would only exist if the system as built were extended to infinity without change of geometry or materials. Thus, when K is referred to herein as a constant of a system of practical size, it always refers to what would exist in the same type of system of infinite size. If K can be made sufficiently greater than unity to indicate a net gain in neutrons in the theoretical system of infinite size, and then an actual system is built to be sufficiently large so that this gain is not entirely lost by leakage from the exterior surface of the system, then a self-sustaining chain reacting system of finite and practical size can be built to produce power and related by-products by nuclear fission of natural uranium. The neutron reproduction ratio in a system of finite size therefore, differs from K by the external leakage factor, and by a factor due to the neutron absorption by localized neutron absorbers, and the reproduction ratio must still be sufficiently greater than unity to permit the neutron density to rise exponentially with time in the system as built.

Progressive empirical enlargement of any proposed system for which the factor K is not accurately known, in an attempt to attain the overall size of a structure of finite size above which the rate of loss of neutrons by diffusion through the periphery of the structure is less than the rate of production of neutrons in the system, leads only to an expensive gamble with no assurance of success. The fact that K is greater than unity and the fact that the critical size is within practical limits must be known rather accurately in advance, as otherwise a proposed structure having a K factor less than unity, or even a K factor greater than but close to unity, might not sustain a chain reaction even if all of the uranium in the world were included.

A self-sustaining chain reaction has heretofore been realized in systems where the fast neutrons emitted by the fission of $U^{235}$ in natural uranium are slowed to thermal or near thermal energies by a material known as a neutron moderator before causing additional fissions in $U^{235}$. Such devices, known as slow neutron reactors, embody reactive compositions where the fissionable material is disposed in an efficient neutron energy moderator, such as heavy water, beryllium and graphite. This slow neutron reaction is fully described and claimed in the Fermi and Szilard application Serial No. 568,904, filed December 19, 1944, now Patent No. 2,708,656.

Many speculations have been made as to whether or not a mass of uranium alone could support and sustain a chain fission reaction. In such a mass, no moderator as such is present, and in consequence, the majority of fast neutrons from fissions taking place therein are not slowed to thermal energies and can have several fates. A body of uranium metal undergoing fission produces its own fission neutrons, and of these some produce further fissions of the $U^{238}$ content of the metal, some produce fission in the $U^{235}$ content of the metal, and some undergo resonance capture in $U^{238}$ leading to the production of $94^{239}$.

If the proportion of neutrons in the latter category predominate, a controllable fast fission chain reaction can be obtained providing that $K$ is greater than unity by a small amount only. Such reactions are conveniently known as controllable fast fission reactions.

As will be brought out later, the absorption of neutrons in the $U^{238}$ content of natural uranium has been found to predominate to such an extent that when natural uranium is used, K is less than unity. It has also been found that neither a fast fission chain reaction nor, in fact, any type of chain fission reaction can be sustained in an infinite mass of uranium having the natural isotope abundance ratio of $U^{238}$ to $U^{235}$ of about 139–1. However, it is possible to obtain a controllable fast fission chain reaction in a uranium mass, if the mass is enriched by addition thereto to define amounts of a more readily fissionable isotope, such as for example, $U^{233}$, $U^{235}$ or even $94^{239}$, and in this case the contribution of neutrons by fast neutron fission of $U^{238}$ is substantial.

It is an object of the present invention to provide a mass of reactive composition predominately uranium metal, capable of sustaining a controllable fast fission chain reaction.

It is another object of the present invention to provide reactive compositions composed primarily of uranium that will have K factors greater than unity, from which neutronic reactors of practical size can be built, capable of sustaining a chain reaction by fast fission.

Neutronic reactors capable of sustaining a fast fission chain reaction are useful, in that substantially all of the neutrons not used to sustain the reaction are absorbed in $U^{238}$ leading to the production of $94^{239}$. The neutron loss ordinarily taking place in the moderator of slow neutron chain reactors is avoided and the conversion efficiency, that is the ratio of $U^{235}$ destroyed by fission to $94^{239}$ produced, is high. Furthermore, fast fission chain reactors "burn" or fission a larger percentage of $U^{238}$ than do slow neutron chain reactors and thus the loss of what has ordinarily been assumed to be the fissionable isotope ($U^{235}$) is reduced over that occurring in slow neutron reactors for equivalent power outputs.

Other objects and advantages of the present invention can be more fully understood by reference to the drawings, wherein:

Fig. 1 is a diagrammatic elevational view, partly in section, of an enriched uranium fast neutron chain reactor and control means therefor; and Fig. 2 is a sectional detail view showing one method whereby a fast neutron chain reactor can be cooled, if desired.

As the general assembly of an illustrative fast fission reactor differs only in the reactive composition used in the structure from a slow neutron device, the main features of a fast fission reactor will first be briefly described as diagrammatically shown in Figs. 1 and 2.

In Fig. 1, the reactive mass 1, which may be spherical, parallelopiped, or cylindrical in shape, is shown as cubical in shape and comprises a mass of uranium fortified or enriched with a thermally fissionable isotope to provide a K factor greater than unity. The amount of enrichment and the required isotope abundance ratios will later be discussed.

As it is impractical at present to form a solid mass of uranium, the mass may be built up from cast or extruded enriched uranium metal blocks 2, machined or otherwise shaped to fit together to form a closely packed mass. In case cooling is desired, small channels may be left in the mass for passage of a coolant, as will be brought out later in the description of Fig. 2.

The reactive mass 1 may be if desired, surrounded by a neutron reflecting and absorbing layer 3, and for fast neutron reactors used primarily for the production of element 94, this layer may be formed of natural uranium blocks 4 and may be about a foot thick. In this manner, many of the neutrons escaping from the reacting mass will either be absorbed in the $U^{238}$ content of the outer layer, or will be scattered back into the reacting mass. Some neutrons, however, will escape outwardly. In addition, gamma radiation is emitted from the reacting mass as a result of fission, and the decay of the fission products. To render the vicinity safe for operating personnel, the entire mass of uranium is preferably enclosed in a thick shield 5 of concrete 10 or more feet thick, for example. Because of its water content, concrete is, in thick layers, effective in reducing both neutron and gamma radiation to safe limits.

Control of the fast neutron chain reaction is, for reactors close to critical size, because of the effect of delayed neutrons, very similar to the control of a slow neutron reaction. Primary control is had by means of a control or regulating rod 6 movable into or out of the reacting mass. The control rod is formed of a material absorbing fast neutrons, such as boron steel or boron carbide, and is driven, for example, by a rack and pinion 7 from in and out motors 8 through a differential 9 under the control of an operator. Extreme in and out positions are determined by respective limit switches 10 and 11 operated by a stop 12 on the rod. The neutron density in the reactor is monitored, as by an ionization chamber 14 positioned to receive and respond to neutron flux from the reacting mass.

A separate safety rod 15 is preferably provided, also of fast neutron absorbing material, to be drawn into the reactor by a weight 16 upon release of a latch 18 which may be operated by hand, or automatically by a solenoid 19 upon excessive rise of neutron density as indicated by the ionization chamber 14. A bumper 20 stops and absorbs the shock of the entering rod.

In addition, it may be desirable to utilize as an additional control, a shim or limiting rod 21 of fast neutron absorbing material which is normally locked by a pin 22 and a lock 24 in place to prevent the reproduction ratio from rising above a predetermined value in case the regulating rod became inoperative in its retracted position.

Fast neutrons generated in the reactor may be used if desired for irradiating of materials by the provision of a well 27 extending into the uranium mass.

In case a fast fission reactor is to be cooled, it is desirable that the coolant take up as little space as possible in the reactor, that it have a low capture cross section, and that its neutron energy moderating properties be low. In Fig. 2, a construction is shown wherein the uranium is in slug form, such as, for example, slugs 25 1.1 inches wide by 4 inches long laid up, or piled, to have small spaces 26 therebetween for flow of coolant, which for low power reactors can be air or helium. For higher powers, a liquid metal coolant may be used, such as molten bismuth. The present application however, is concerned solely with the characteristics of the reacting uranium mass broadly, special arrangements thereof for cooling purposes forming the subject matter of other applications. The main consideration in all cooling systems as applied to uranium fast neutron reactors is to keep the effective density of the reactive mass as close as possible to the real density of the metal, which is about 18.9 gms./cm.$^3$ In order that the K factor be known, it is necessary that the capture to fission ratio for uranium compositions embodying two isotopes $U^{235}$ and $U^{238}$ be known. The following values for constants for uranium agree with experimental data.

Inelastic scattering cross section of natural uranium for fast neutrons=$2.7 \times 10^{-24}$ cm.$^2$ Fission cross-section of $U^{238}$ for fast neutrons= $0.6 \times 10^{-24}$ cm.$^2$ Capture cross-section of $U^{238}$ for slow neutrons= $0.30 \times 10^{-24}$ cm.$^2$ Fission cross-section of $U^{235}$ for slow neutrons= $2.52 \times 10^{-24}$ cm.$^2$ Scattering cross section of natural uranium for fast and slow neutrons $= 5.9 \times 10^{-24}$ cm.$^2$ Number of fast neutrons per $U^{238} = 1.40$.
Number of slow neutrons per $U^{238}$ fission $= 0.50$.
Number of fast neutrons per $U^{235}$ fission $= 1.65$.
Number of slow neutrons per $U^{235}$ fission $= 0.55$.

In the case of the uranium stacked reactor as previously described and shown in Figure 2, the fast neutrons are 6 m. e. v. and the slow neutrons 170 k. e. v., giving an overall average neutron energy of about 250 k. e. v. for the equilibrium neutron energy distribution in such a uranium reactor.

The ratio of $U^{238}$ capture to total fission for equilibrium neutron energy distribution is 11.

The ratio of $U^{235}$ fissions to $U^{238}$ fissions per atom for the equilibrium neutron energy distribution is 336.

From the measurements discussed above, the enrichment of uranium metal in the fissionable isotope $U^{235}$ can be determined in terms of K factors, and when K factors above unity are obtained, the critical and operating sizes can also be found. The table below gives the K values for various enrichments.

| $U^{238}/U^{235}$ ratio | Percent $U^{235}$ | Overall Capture/fission ratio $U^{235}$, $U^{238}$ | K factor |
|---|---|---|---|
| 139 (natural U) | 0.71 | 11.4 | .34 |
| 14 | 6.66 | 1.27 | .93 |
| 12.1 | 7.63 | 1.11 | 1.00 |
| 12 | 7.68 | 1.10 | 1.01 |
| 11 | 8.33 | 1.02 | 1.05 |
| 10 | 9.09 | .94 | 1.11 |

It will thus be seen that critical enrichment occurs for a ratio of $U^{238}$ to $U^{235}$ of 12.1 and corresponds to enrichment of natural uranium in $U^{235}$ by a factor of 11.5 or a uranium having a $U^{235}$ content of 7.63% as against the natural uranium content of 0.71% $U^{235}$.

It is thus clear that natural uranium in a mass infinite in extent will not sustain a chain reaction under any circumstances.

Knowing the K factors for various enrichments, critical and operating sizes for the reactor herein described can readily be determined. Critical sizes are given below for three compositions.

| K=1.01 | K=1.05 | K=1.11 |
|---|---|---|
| Critical Volume (Cube)=48.6 m.$^3$ Side in Cm.=365 Weight U=920 tons | Critical Volume (Cube)=4.16 m.$^3$ Side in Cm.=161 Weight U=78.6 tons | Critical Volume (Cube)=1.41 m.$^3$ Side in Cm.=112 Weight U=26.6 tons |

The above sizes are critical sizes, i. e., the size at which the neutron reproduction ratio is exactly unity. In order that the reaction may reach a desired neutron density a slight increase in size is necessary. However, this size must not be too large or control may be difficult, as will now be discussed.

A fast fission chain reaction is controllable in much the same manner as a slow neutron chain reaction because of the delayed emission of neutrons in the fission process. There is a substantial time factor in the rise of neutron density after a reproduction ratio of unity has been exceeded in a fast fission reactor due to the fact that a substantial portion, generally about one percent, of the fast neutrons generated in a neutronic reactor are "delayed neutrons." These delayed fast neutrons may appear at any time up to several minutes after the fission has occurred. Half these neutrons are emitted within six seconds and .9 within 45 seconds. The mean time of delayed emission is about 5 seconds. The fission cycle is completed by 99 percent of the neutrons in about .0015 second, but if the reproduction ratio of the reactor is near unity, the extra 1 percent may make all the difference between an increase or a decrease in the activity.

The fact that the last neutron in the cycle is held back, as it were, imparts a slowness of response to the reactor that would not be present if the 100n neutrons were all emitted instantaneously.

For cases in which the reproduction ratio ($r$) differs from unity by (appreciably) less than 1 percent the rise of neutron density, or more specifically the value N to which the number of neutrons has risen from an original value $N_0$, after a lapse of time of $t$ seconds during and before which the pile has operated at a fixed value of $r$ ($N_0$ being the number of neutrons at the beginning of $t$, i. e., after disappearance of transient effects due to any preceding change in $r$), is given by—

$$N = N_0 e^{wt}$$

where $$w = \frac{r-1}{\alpha - (r-1)} \cdot \frac{1}{T}$$

In this formula $\alpha$ is the fraction of the neutrons that are delayed, i. e., $\alpha = .0067$, and T is the mean time of delayed emission of the delayed neutrons (5 seconds). The above formula is only approximate because it uses an average delay time.

As an example, if the reproduction ratio is 1.001, and the system has settled down to a steady exponential rise in neutron density, then $$w = \frac{.001}{.0067 - .001} \cdot \frac{1}{5} = \frac{1}{28.5}$$

that is, $N/N_0 = 2.75$ in 28.5 seconds. Hence doubling of the neutron density occurs about every 20 seconds. The above formula thus indicates the rate of rise for relatively low values of $r$ and shows how the reduction of the rate of the delayed neutron effect is particularly significant in the stated lower range of $r$ values. Strictly speaking, the given equation holds only for the steady state, i. e., where $r$ has been held constant for some time; an additional transient term must be included to obtain an accurate representation of the neutron density during the first few seconds after a sudden change of $r$.

If $r$ were to be exactly 1.01, a more detailed theory shows that the neutron density would be more than tripled per second. However, if the reproduction ratio $r$ is several percent greater than unity, so that the one percent delayed neutrons are unimportant compared with $r-1$, the density increases at a much more rapid rate as given approximately by $r^{t/l}$ where $l$ is .0015 second, the normal time to complete a cycle. If $r$ were 1.02 and 1.03, the factor by which the neutron density would be multiplied per second would be 1100 and 700,000, respectively. If $r$ were to be made 1.04, the neutron density would increase in 1.5 seconds by a factor of approximately $10^{17}$ over its original level.

It is thus apparent that the operating conditions should always be such that the neutron reproduction ratio does not materially exceed 1.01 as the rate of rise of neutron density could then be so fast as to be uncontrollable.

There are several ways by which such operating conditions can be met. One of the simplest is to make the actual operating size of the structure such that a reproduction ratio of 1.01 cannot be attained when all control absorbers are removed. A safe value for the maximum attainable reproduction ratio is about 1.005 at the temperature and power of operation, and low power reactors can be built so that size alone limits the reproduction factor below 1.01.

Thus, it can be seen that a fast fission chain reaction having a K factor only slightly above unity is controllable, due to the delayed neutrons, in the same manner as a slow neutron chain reaction, the main difference being that control absorbers of every type are to be of a material strongly absorbing fast neutrons, such as boron, boron steel, boron carbide or other boron compositions.

As set forth in the above cited application, both critical and operating sizes can be found by use of the formula $$\frac{K-1-x}{M^2}=\frac{3\pi^2}{a^2}$$

for a cube, where $K$ is the reproduction factor of the reactive composition, $M$ is the migration length of the neutron and is proportional to the mean root square distance a neutron travels in the uranium between birth by fission and death by capture (in uranium reactors, $M^2$ is about 44 cm.$^2$ for the K factors discussed above and decreases as K increases and where $a$ is the side of the cube), and $x$ is a factor which includes the excess reproduction ratio desired, i. e., such as .005, and also such other K factor reductions as may be introduced by neutron absorption due to the use of coolant and/or coolant tubes or other neutron absorbers inside the reactr.

When other overall shapes are used for the reactor the above formula is modified in accordance with the coordinates of the shape used.

Both critical and operating sizes can be reduced somewhat by the use of a reflector around the reactor, and when uranium with normal isotopic abundance ratio is used as the reflecting material, the side dimensions given above can be reduced by a few centimeters.

Natural uranium can be enriched in the fissionable isotope $U^{235}$ by the use of isotope separation devices of the diffusion barrier type, or by the use of a mass spectroseparator. $U^{233}$ is obtainable in quantity by irradiation of thorium by slow neutrons, as when a neutronic reactor of small dimensions is surrounded by a thorium blanket. The thermally fissionable isotope $94^{239}$ is also formed in the operation of a neutronic reactor when $U^{238}$ is present. Both $U^{233}$ and $94^{239}$ can be chemically separated from their parent element.

The enrichment of natural uranium by any of the isotopes $U^{233}$, $U^{235}$ or $94^{239}$ is deemed to be the full equivalent of uranium enriched in $U^{235}$, and the word uranium as used herein in both specification and claims is used as meaning a reactive uranium composition where the predominating isotope is $U^{238}$.

Controllable fast neutron reactors of the type broadly described herein can be used to efficiently produce element $94^{239}$, in which case, after a sufficient shutdown time, such as, several months, for example, to permit radioactivity in the metal to subside, the reactor can be dismantled and the uranium processed to recover the $94^{239}$ formed therein. Or, the reactor can be used to provide large numbers of fast neutrons for irradiation of various materials, placed in well 20 or in the neutron beam emitted from this well. When high boiling point liquids are used as coolants, power can be obtained from the reactor by heating the coolant above the boiling point of water in the reactor and then utilizing the coolant to generate steam outside of the reactor. Other uses will suggest themselves to those skilled in the art of nuclear physics.

What is claimed is:

1. A fast neutronic reactor having a cubical reactive mass weighing at least 920 metric tons consisting essentially of uranium metal containing predominantly $U^{238}$ and having a $U^{235}$ content of at least 7.63% and having a maximum neutron reproduction ratio while operating at an average neutron energy of 250 k. e. v. of not substantially over 1.01.

2. The method of producing a controllable fast neutron chain reaction which comprises adding to natural uranium $U^{235}$ until the total content of $U^{235}$ in said uranium is at least 7.63% and the $U^{238}$ content predominates, assembling a closely packed mass of said uranium as metal to a cubical size of at least 920 tons while limiting the maximum neutron reproduction ratio to not substantially over 1.01 by the insertion and withdrawal of a varying amount of boron.

3. The reactor of claim 1 wherein the reactive mass is substantially free of moderator.

References Cited in the file of this patent

UNITED STATES PATENTS

| 2,708,656 | Fermi et al. | May 17, 1955 |

FOREIGN PATENTS

| 114,150 | Australia | May 2, 1940 |
| 114,151 | Australia | May 3, 1940 |
| 233,011 | Switzerland | Oct. 2, 1944 |
| 233,278 | Switzerland | Oct. 16, 1944 |

OTHER REFERENCES

Physical Review, March 1939, vol. 55, pp. 511, 512; April 1940, vol. 57, p. 748.

Roberts et al.: J. App. Physics, vol. 10, pp. 612–614 (1939).

Nature, May 13, 1939, p. 793.

Chemical Abstracts, 1940, p. 7734.

Power, July 1940, pp. 56–59.

Business Week, September 1, 1945, pp. 57–63.

Smyth: "Atomic Energy for Military Purposes," pp. 20, 68, 69, 152, 153, 174, 175, 176, 178, August 1945, Supt. of Doc., Washington, D. C.

Goodman: "The Science and Engineering of Nuclear Power," vol. 1, pp. 274, 275, 279, Addison-Wesley (1947).

Glasstone: "Sourcebook on Atomic Energy," pp. 314, 382, 383, Van Nostrand, New York. (1950).

Pollard and Davidson: "Applied Nuclear Physics," p. 256, John Wiley & Sons, New York. (1951).